United States Patent [19]
Grigsby, Jr. et al.

[11] Patent Number: 5,106,935
[45] Date of Patent: Apr. 21, 1992

[54] REACTION INJECTION MOLDED ELASTOMERS PREPARED FROM AMINE TERMINATED POLYETHERS, AMINE TERMINATED CHAIN EXTENDER, A POLYCARBONATE DIOL CONTAINING QUASIPREPOLYMER

[75] Inventors: Robert A. Grigsby, Jr., Georgetown; Wheeler C. Crawford, Houston; Michael Cuscurdia, Austin, all of Tex.

[73] Assignee: Texaco Chemical Company, White Plains, N.Y.

[21] Appl. No.: 471,255

[22] Filed: Jan. 26, 1990

[51] Int. Cl.$^5$ .............................................. C08G 18/10
[52] U.S. Cl. .................................. 528/59; 264/328.1; 264/328.6; 264/328.8; 528/60; 528/61; 528/64
[58] Field of Search ............... 264/328.1, 328.6, 328.8; 528/59, 60, 61, 64

[56] References Cited

U.S. PATENT DOCUMENTS

| | | | |
|---|---|---|---|
| 4,396,729 | 8/1983 | Dominguez et al. | 521/51 |
| 4,433,067 | 2/1984 | Rice et al. | 521/51 |
| 4,444,910 | 4/1984 | Rice et al. | 521/51 |
| 4,456,745 | 6/1984 | Rajan | 528/85 |
| 4,507,444 | 3/1985 | Slawyk et al. | 525/455 |
| 4,822,841 | 4/1989 | Murray et al. | 524/356 |

Primary Examiner—Maurice J. Welsh
Assistant Examiner—Rachel Johnson
Attorney, Agent, or Firm—Jack H. Park; Kenneth R. Priem

[57] ABSTRACT

The invention relates to reaction injection molded elastomers derived from high molecular weight amine terminated polyethers, an aromatic diamine chain extender and a quasi-prepolymer made from an excess of polyisocyanate reacted with polycarbonate polyols and polyether polyols.

20 Claims, No Drawings

REACTION INJECTION MOLDED ELASTOMERS PREPARED FROM AMINE TERMINATED POLYETHERS, AMINE TERMINATED CHAIN EXTENDER, A POLYCARBONATE DIOL CONTAINING QUASIPREPOLYMER

BACKGROUND OF THE INVENTION

1. Field of the Invention

This invention concerns the field of reaction injection molded elastomers.

2. Description of Related Publications

U.S. Pat. Nos. 4,396,729; 4,444,910; 4,333,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still unreacted.

U.S. Pat. Nos. 4,822,841 describes the use of a polycarbonate diol, polyoxyalkylene glycol, and a diisocyanate all in a solvent. This mixture, which does contain excess diisocyanate, is then reacted with a polyoxyalkylene diamine. Again, an excess of isocyanate is present. To the excess isocyanate, a monohydric ethylenic compound, such as 2-hydroxyethyl acrylate, is to completely react with the excess isocyanate. This product is then polymerized or cured by radiation exposure.

U.S. Pat. No. 4,456,745 describes the syntheses and use of a quasi-prepolymer prepared from a polycarbonate, polyol and aromatic isocyanate. The quasi-prepolymer is suggested for use in RIM using a polyol and an aromatic amine chain extender.

U.S. Pat. No. 4,507,444 describes the use of polycarbonates in quasi-prepolymers. The elastomer is prepared from graft polymerization.

SUMMARY OF THE INVENTION

The invention is reaction injection molded (RIM) elastomer comprising a cured reaction product of primary or secondary amine terminated polyethers of greater than 1,500 molecular weight, an amine terminated chain extender and an aromatic polyisocyanate which is the reaction product of an excess of an aromatic polyisocyanate with polycarbonate polyols and polyether polyols. The invention is also a method of preparation of a RIM polyurea elastomer as described above.

DESCRIPTION OF THE PREFERRED EMBODIMENTS

The RIM elastomer of this invention may be prepared from as few as three ingredients described below. A high molecular weight amine terminated polyether, an amine terminated chain extender and an aromatic polyisocyanate which is the reaction product of an excess of an aromatic polyisocyanate with polycarbonate polyols and polyether polyols.

The amine terminated polyethers useful in this invention include primary and secondary amine terminated polyether polyols of greater than 1,500 average molecular weight having from 2 to 6 functionality, preferably from 2 to 3, and an amine equivalent weight from about 750 to about 4,000. Mixtures of amine terminated polyethers may be used. In a preferred embodiment the amine terminated polyethers have an average molecular weight of at least 2,500.

The amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have grater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The amine terminated diamine chain extender useful in this invention include, for example, 1-methyl-3,5-diethyl-2,4-diaminobenzene, 1-methyl-3,5 diethyl-2-6 diaminobenzene (both of these materials are also called diethyltoluene diamine or DETDA), 1,3,5-triethyl-2,6 diaminobenzene, 3,5,3', 5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

A wide variety of polyaromatic polyisocyanates may be used here. Typical aromatic polyisocyanates include polymethylene polyphenylisocyanate, naphthalene-1,4-diisocyanate, bis(4-isocyanatophenyl)methane, (bis(3-methyl-4-isocyanatophenyl)methane, and 4,4'diphenylpropane diisocyanate.

Isocyanates such as:

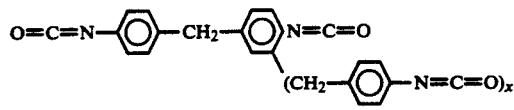

$x = 0, 1, 2$ useful, its volatility and faster reactivity may limit its usefulness.

Other polyaromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred polyaromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

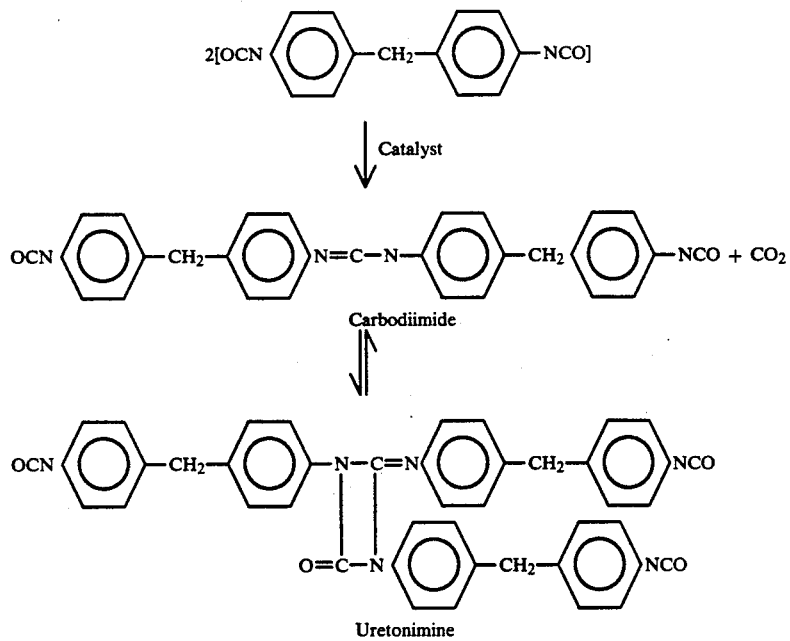

Examples of a commercial material of this type is Dow's ISONATE® 143L. Preferably, the amount of isocyanates used is the stoichiometric amount based on all the ingredients in the formulation or greater than the stoichiometric amount.

The polyisocyanate useful herein is in the form of a quasiprepolymer. The quasi-prepolymer is made by reacting an excess of the polyisocyanate with polycarbonate polyols and polyether polyols.

The polyether polyols useful in preparing this quasi-prepolymers above in this invention are alkylene oxide adducts of a polyhydric alcohol with a functionality of about 2 to about 4. The alkylene oxide may suitably be ethylene oxide, propylene oxide, or 1,2-butylene oxide, or a mixture of some or all of these. Useful polyols have a molecular weight range from about 2,000 to about 7,000 although this range is not critical.

Various polycarbonate polyols are useful in this invention. Those skilled in the art will appreciate that many polycarbonate molecules containing two or more hydroxyl groups would be useful in this invention. For example, U.S. Pat. No. 4,468,483 describes an aromatic polyester polycarbonate of the structure:

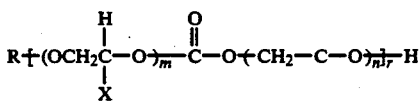

where m and n independently are integers of from 1 to 5, r is an integer of from 1 to 5, X is hydrogen, methyl or ethyl and R is the residue of an aromatic polyester polyol.

Also U.S. Pat. Nos. 4,267,120 and 4,435,527 concern polyester polycarbonates of the following structure:

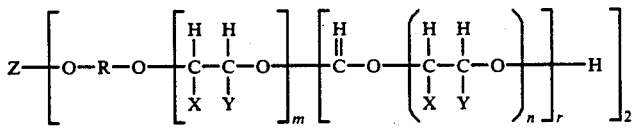

wherein X and Y, independently, are H, methyl, or ethyl, m and n independently are integers of 1-5, R is a nucleus of a glycol selected from the group of lower alkylene glycols and polyalkylene glycols of up to about 600 molecular weight, Z is an organic radical from a cyclic organic acid anhydride having 4-20 carbon atoms and r is an integer of 1-5.

The above polycarbonate polyols and other variations known to those skilled in the art are useful in this invention.

Preferred polycarbonate polyols are described as follows:

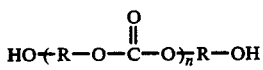

R can be an alkyl, aryl, and/or alkylaryl groups. The product can have a hydroxyl number ranging from about 30 to 200. Especially preferred are those prepared from alkyl carbonates.

Catalysts are optional but not usually necessary for the preparation of the RIM material of this invention. In a preferred embodiment of our invention no added catalysts are employed.

Other conventional formulation ingredients may be employed as needed such as; for example, foam stabilizers, also known as silicone oils or emulsifiers. The foam stabilizers may be an organic silane ord siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other mineral fibers are useful.

Post curing of the elastomer of the invention is optional. Post curing will improve some properties such as heat sag. Employment of post curing depends on the desired properties of the end product.

The examples which follow exemplify this invention. However, these examples are not intended to limit the scope of the invention.

EXAMPLES

Preparation of the quasi-prepolymer

1. Quasi-prepolymer 1

DURACARB® 120 (7.8 lbs), which had been heated to make the material fluid, and PPG-2000 (7.8 lbs) were added to an open top 5-gallon can. Isonate 143L (23.4 lbs) was added to the contents of the can with stirring. After a few minutes, this material was poured into a nitrogen purged can and rolled for three hours. After sitting for several days, analysis of this material showed 3.44 meq/g of isocyanate in the product.

2. Quasi-prepolymer 2

DURACARB® 124 (7.6 lbs), which had been heated to make the material fluid, and PPG-2000 (7.6 lbs) were added to an open top 5-gallon can. Isonate 143L (22.8 lbs) was added to the contents of the can with stirring. After a few minutes, this material was poured into a nitrogen purged can and rolled for three hours. After sitting for several days, analysis of this material showed 3.81 meq/g of isocyanate in the product.

3. Standard Quasi-prepolymer without Polycarbonate

The general preparation of the standard prepolymer is as follows:

PPG-2000 (200 lbs) was added to a partial drum containing Isonate 143L (300 lbs). The contents of the drum were rolled for several hours. After sitting for several days, analysis of this material showed 3.72 meq/g of isocyanate in the product.

Preparation of Polyurea RIM Elastomers

4. DETDA (25.0 lbs), JEFFAMINE® T-3000 (14.25 lbs), JEFFAMINE D-2000 (14.25 lbs), and zinc stearate (1.5 lbs) were charged into the B-component working tank of the Accuratio RIM machine. The contents of the tank were heated to 190° F. and held there, for thirty minutes, to dissolve the zinc stearate. The contents of this tank were cooled to 113° F. The A-tank on the RIM machine was charged with the quasi-prepolymer of Example 1 and heated to 131° F. The components were pressured up to 2300 psi on the A side and 2100 psi on the B side and injected into a flat plaque mold (18"×18"×⅛") which had been preheated to 185° F. The part was removed from the mold in 30 seconds. The resulting elastomer was post cured at 311° F. for thirty minutes. Physical properties of the elastomer are listed in Table 1.

5. DETDA (25.32 lbs), JEFFAMINE T-3000 (14.10 lbs), JEFFAMINE D-2000 (14.10 lbs), and zinc stearate (1.48 lbs) were charged into the B-component working tank of the Accuratio RIM machine. The contents of the tank were heated to 190° F. and held there, for thirty minutes, to dissolve the zinc stearate. The contents of this tank were cooled to 118° F. The A-tank on the RIM machine was charged with the quasi-prepolymer of Example 2 and heated to 130° F. The components were pressured up to 2000 psi on the A side and 2100 psi on the B side and injected into a flat plaque mold (18"×18"×⅛") which had been preheated to 181° F. The part was removed from the mold in 30 seconds. The resulting elastomer was post cured at 311° F. for thirty minutes. Physical properties of the elastomer are listed in Table 1.

6. (Prior art example)

DETDA (25.34 lbs), JEFFAMINE T-3000 (14.11 lbs), JEFFAMINE D-2000 (14.11 lbs), and zinc stearate (1.44 lbs) were charged into the B-component working tank of the Accuratio RIM machine. The contents of the tank were heated to 190° F. and held there, for thirty minutes, to dissolve the zinc stearate. The contents of this tank were cooled to 122° F. The A-tank on the RIM machine was charged with the standard quasi-prepolymer and heated to 112° F. The components were pressured up to 2000 psi on the A side and 2000 psi on the B side and injected into a flat plaque mold (18"×18"×⅛") which had been preheated to 181° C. The part was post cured at 311° F. for thirty minutes. Physical properties of the elastomer are listed in Table 1.

TABLE 1

| | Example 4 | Example 5 | Example 6 |
|---|---|---|---|
| Formulation | | | |
| DETDA | 52.65 | 53.90 | 49.39 |
| JEFFAMINE T-3000 | 30.0 | 30.0 | 27.5 |
| JEFFAMINE D-3000 | 30.0 | 30.0 | 27.5 |
| ZINC STEARATE | 3.16 | 3.16 | 2.80 |
| ISONATE 143L | 119.25 | 113.04 | 103.19 |
| DURACARB 120 | 39.75 | | |
| DURACARB 124 | | 37.68 | |
| PPG-2000 | 39.75 | 37.68 | 68.0 |
| HARD BLOCK | 54.65 | 54.65 | 54.65 |
| Physical Properties: | | | |
| SHORE D | 78/75 | 78/76 | 74/70 |
| TENSILE, psi | 4870 | 5225 | 4890 |
| ULT. elong. | 100 | 100 | 130 |
| Flexural modulus | | | |
| 77° F. | 109000 | 111000 | 98000 |
| 58° F. | 66000 | 77000 | 66000 |
| −20° F. | 266000 | 265000 | 21600 |
| 311° F. | 38000 | 47000 | 50000 |
| HEAT SAG | | | |
| 250° F. | 5.5 | 3.0 | 9 |
| 311° F. | 10 | 10 | |
| IZOD IMPACT | 26 | 29 | 28 |

GLOSSARY OF TERMS AND MATERIALS

| | |
|---|---|
| DURACARB ® 120 | Polycarbonate diol using a hydroxyl number range of 121-135. (Sold by PPG Industries.) |
| DURACARB ® 124 | Polycarbonate diol having a hydroxyl number range of 50 to 62. (Sold by PPG Industries.) |
| ISONATE ® 143L | Carbodiimide modified liquid MDI, a product of the Dow Chemical. |
| JEFFAMINE ® D-2000 | Polypropylene oxide diamine of about 2,000 molecular weight. |
| JEFFAMINE ® T-3000 | Polypropylene oxide triamine of about 3,000 molecular weight. |
| DETDA | Diethyltoluene diamine. |

What is claimed is:

1. A reaction injection molded elastomer made by reacting in a closed mold ingredients comprising amine terminated polyethers of greater than 1,500 average molecular weight having greater than 50% of their active hydrogens in the form of amine hydrogens, an amine terminated chain extender and an aromatic polyisocyanate which is the reaction product of an excess of an aromatic polyisocyanate with polycarbonate polyols and polyether polyols.

2. An elastomer as in claim 1 wherein the amine terminated polyethers have an average molecular weight of at least 2,500.

3. An elastomer as in claim 1 wherein the amine terminated polyethers have a functionality ranging from about 2 to 6.

4. An elastomer as in claim 1 wherein the amine terminated polyethers have a functionality ranging from about 2 to 3.

5. An elastomer as in claim 1 wherein the amine terminated polyether is an aminated polyoxypropylene triol having an average molecular weight of about 5,000.

6. A reaction injection molded elastomer made by reacting in a closed mold ingredients comprising amine terminated polyethers of at least 2,500 molecular weight and having a functionality of from about 2 to 3 having greater than 50% of their active hydrogens in the form of amine hydrogens, an amine terminated chain extender and an aromatic polyisocyanate which is the reaction product of an excess of an aromatic polyisocyanate with polycarbonate polyols and polyether polyols.

7. A reaction injection molded elastomer made by reacting in a closed mold ingredients comprising amine terminated polyethers of at least 5,000 molecular weight and having a functionality of from about 2 to 3 having greater than 50% of their active hydrogens in the form of amine hydrogens, an amine terminated chain extender and an aromatic polyisocyanate which is the reaction product of an excess of an aromatic polyisocyanate with polycarbonate polyols and polyether polyols.

8. A method for making a reaction injection molded elastomer comprising reacting in a closed mold amine terminated polyethers greater than 1,500 average molecular weight having greater than 50% of their active hydrogens in the form of amine hydrogens, an amine terminated chain extender and an aromatic polyisocyanate which is the reaction product of an excess of an aromatic polyisocyanate with polycarbonate polyols and polyether polyols.

9. A method as in claim 8 wherein the amine terminated polyethers have an average molecular weight of at least 2,500.

10. A method as in claim 8 wherein the amine terminated polyethers have a functionality ranging from about 2 to 6.

11. A method as in claim 8 wherein the amine terminated polyethers have a functionality ranging from about 2 to 3.

12. A method as in claim 8 wherein the amine terminated polyether is an aminated polyoxypropylene triol having an average molecular weight of about 5,000.

13. A method for making a reaction injection molded elastomer comprising reacting in a closed mold amine terminated polyethers of at least 2,500 molecular weight and having a functionality of from about 2 to 3 having greater than 50% of their active hydrogens in the form of amine hydrogens, an amine terminated chain extender and an aromatic polyisocyanate which is the reaction product of an excess of an aromatic polyisocyanate with polycarbonate polyols and polyether polyols.

14. A method for making a reaction injection molded elastomer comprising reacting in a closed mold amine terminated polyethers of at least 5,000 molecular weight and having a functionality of from about 2 to 3 having greater than 50% of their active hydrogens in the form of amine hydrogens, an amine terminated chain extender and an aromatic polyisocyanate which is the reaction product of an excess of an aromatic polyisocyanate with polycarbonate polyols and polyether polyols.

15. A reaction injection molded elastomer made by reacting in a closed mold ingredients comprising amine terminated polyethers of greater than 1,500 average molecular weight having a greater than 50% of their active hydrogens in the form of amine hydrogens, diethyltoluene diamine, and an aromatic polyisocyanate which is the reaction product of an excess of an aromatic polyisocyanate with polycarbonate polyols and polyether polyols.

16. A reaction injection molded elastomer made by reacting in a closed mold ingredients comprising amine terminated polyethers of at least 2,500 molecular weight and having a functionality of from about 2 to 3 having greater than 50% of their active hydrogens in the form of amine hydrogens, diethyltoluene diamine, and an aromatic polyisocyanate which is the reaction product of an excess of an aromatic polyisocyanate with polycarbonate polyols and polyether polyols.

17. A reaction injection molded elastomer made by reacting in a closed mold ingredients comprising amine terminated polyethers of at least 5,000 molecular weight and having a functionality of from about 2 to 3 having greater than 50% of their active hydrogens in the form of amine hydrogens, diethyltoluene diamine, and an aromatic polyisocyanate which is the reaction product of an excess of an aromatic polyisocyanate with polycarbonate polyols and polyether polyols.

18. A method for making a reaction injection molded elastomer comprising reacting in a closed mold amine terminated polyethers greater than 1,500 average molecular weight having greater than 50% of their active hydrogens in the form of amine hydrogens, diethyltoluene diamine and an aromatic polyisocyanate which is the reaction product of an excess of an aromatic polyisocyanate with polycarbonate polyols and polyether polyols.

19. A method for making a reaction injection molded elastomer comprising reacting in a closed mold amine terminated polyethers greater than 2,500 molecular weight and having a functionality of from about 2 to 3 having greater than 50% of their active hydrogens in the form of amine hydrogens, diethyltoluene diamine and an aromatic polyisocyanate which is the reaction product of an excess of an aromatic polyisocyanate with polycarbonate polyols and polyether polyols.

20. A method for making a reaction injection molded elastomer comprising reacting in a closed mold amine terminated polyethers of at least 5,000 molecular weight and having a functionality of from about 2 to 3 having greater than 50% of their active hydrogens in the form of amine hydrogens, diethyltoluene diamine and an aromatic polyisocyanate which is the reaction product of an excess of an aromatic polyisocyanate with polycarbonate polyols and polyether polyols.

* * * * *